(12) United States Patent
Hooper et al.

(10) Patent No.: US 7,100,102 B2
(45) Date of Patent: Aug. 29, 2006

(54) METHOD AND APPARATUS FOR PERFORMING CYCLIC REDUNDANCY CHECKS

(75) Inventors: Donald F. Hooper, Shrewsbury, MA (US); Matthew J. Adiletta, Bolton, MA (US); Stephanie L. Hirnak, Bedford, MA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 10/666,693

(22) Filed: Sep. 18, 2003

(65) Prior Publication Data

US 2005/0066256 A1    Mar. 24, 2005

(51) Int. Cl.
*H03M 13/00* (2006.01)
(52) U.S. Cl. .................................... 714/758
(58) Field of Classification Search ................ 714/758

See application file for complete search history.

(56) References Cited

OTHER PUBLICATIONS

Venkatachalam et al., A high flexible, distributed multiprocessor architecture for network processing, 4-2003, Elsevier Science, elsevier.com, p. 563-586.*
Saxena et al., Dependable computing and online testing in adaptive and configurable systems, Jan.-Mar. 2000, IEEE, p. 29-41.*

* cited by examiner

*Primary Examiner*—Shelly Chase
(74) *Attorney, Agent, or Firm*—Larry M. Mennemeier

(57) ABSTRACT

Method and apparatus for performing centralized cyclic redundancy checks (CRC). For one embodiment a current thread of execution compares a connection index with that of a previous thread of execution. If they share the same connection index, a CRC calculation may be performed without providing a CRC residue to a centralized CRC unit since the most recently produced CRC residue by would be associated with a preceding sequential cell of the same packet. For an alternative embodiment a current thread of execution requests a CRC calculation and provides a connection index to the centralized CRC unit, which is used to access a content addressable memory (CAM). A hit in the CAM indicates that the CRC unit may use the CRC residue associated with the connection index in the CAM since it would have resulted from a preceding sequential cell.

27 Claims, 8 Drawing Sheets

METHOD AND APPARATUS FOR PERFORMING CYCLIC REDUNDANCY CHECKS

FIELD OF THE DISCLOSURE

This disclosure relates generally to the field of data transmission. In particular, the disclosure relates to calculation and storage of cyclic redundancy check (CRC) residues with associated connection indices for multiple connections.

BACKGROUND OF THE DISCLOSURE

A cyclic redundancy check (CRC) is a widely used technique wherein a particular polynomial is used to assure data reliability. The CRC may be used to protect blocks of data called frames or cells wherein, the transmitter appends an extra n-bit sequence called a frame check sequence (FCS). The FCS holds redundant information about the frame that helps the receiver detect errors.

For example, some commonly used polynomials for CRC calculations are:

CRC-12: $X^{12}+X^{11}+X^{3}+X^{2}+X+1$,
CRC-16: $X^{16}+X^{15}+X^{2}+1$,
CRC-CCITT: $X^{16}+X^{12}+X^{5}+1$,
CRC-32: $X^{32}+X^{26}+X^{23}+X^{22}+X^{16}+X^{12}+X^{11}+X^{10}+X^{8}+X^{7}+X^{5}+X^{4}+X^{2}+X1$.

CRC-32, for example, generates a 32-bit FCS, which is used by the local network standards committee (IEEE-802) and some Department of Defense (DOD) applications. The same algorithm or hardware may be used to compute the FCS or to check the data using the FCS. By appending an extra n-bit sequence of zeroes to the data as input, an FCS will be produced as output. By appending the n-bit FCS sequence to the data as input, an n-bit sequence of zeroes will be produced as output if there are no transmission errors.

A network processor may perform CRC calculations as a transmitter and/or as a receiver for multiple frames or cells of one data packet or of multiple data packets. These packets may be of various different internetworking protocols or of one particular internetworking protocol. For example, Asynchronous Transfer Mode (ATM) is a set of protocols that use the concept of a connection and require ATM specific signaling protocols and addressing structures, as well as protocols to route ATM connection requests across an ATM network. A virtual circuit is set up across the ATM network prior to transferring data. ATM circuits can be virtual paths, identified by a virtual path identifier (VPI) or virtual channels, identified by the combination of a VPI and a virtual channel identifier (VCI). A virtual path is a bundle of virtual channels with a common VPI.

A typical network processor while operating as an ATM switch receives a cell of a specific VCI/VPI value; looks up the connection value in a local connection table to retrieve an associated CRC residue, identify an outgoing port and optionally get a new VPI/VCI value for that particular connection; calculates a new CRC residue for the connection to update the local connection table, and retransmits the cell on that outgoing link with appropriate connection identifiers. For example, one of the more common ATM Adaptation Layers (AAL) used to transmit data across ATM networks is called AAL5. AAL5 requires packets transmitted using a particular connection to be received in sequence, without interleaving cells of different packets on the same connection so that the receiver will be able to reconstruct the packet. Updating the CRC residue for the connection, permits sequential CRC calculations for the packet. Unfortunately, as the network processor may be handling a large number of connections, the local table may become rather large, and latencies for repeated accesses to retrieve and to update CRC residues may represent a significant fraction of time in processing the packet.

Some network processors have provided for switching between multiple software threads of execution to permit access latencies to overlap with useful computations. Commonly though, cases may arise in which adjacent software threads may be processing sequential cells of the same connection as shown with reference to adjacent threads 301 and 302 of FIG. 3. In such cases, an access 315 to retrieve an updated CRC residue must necessarily be performed sequentially with respect to the access 314 that updates the CRC residue. Therefore, potential throughput of the network processor may be limited by the frequency of occurrence of these cases. Unfortunately, the frequency may be rather high for some commonly used AALs (like AAL5 for example).

BRIEF DESCRIPTION OF THE DRAWINGS

The present invention is illustrated by way of example and not limitation in the figures of the accompanying drawings.

DETAILED DESCRIPTION

Disclosed herein are processes and apparatuses for performing centralized cyclic redundancy checks (CRC). For one embodiment a current thread of execution compares a connection index with that of a previous thread of execution. If the two threads share the same connection index, a CRC calculation may be requested without providing a CRC residue to the centralized CRC unit since the CRC residue most recently produced by the CRC unit would have resulted from a preceding sequential cell of the same packet. Therefore the CRC calculation may proceed without suffering the latency associated with reading and writing the CRC residue.

For an alternative embodiment a current thread of execution requests a CRC calculation providing a connection index to the centralized CRC unit, which uses the connection index to access a content addressable memory (CAM). If the connection index produces a hit in the CAM, the CRC unit may use the CRC residue in the CAM associated with the connection index since it would have resulted from a preceding sequential cell of the same packet. Therefore the CRC calculation may proceed without suffering the latency associated with reading and writing the CRC residue even when threads processing sequential cells of the same connection are interleaved for execution with threads of a different connection.

These and other embodiments of the present invention may be realized in accordance with the following teachings and it should be evident that various modifications and changes may be made in the following teachings without departing from the broader spirit and scope of the invention. It will be appreciated that while examples presented below illustrate performing centralized CRC calculations, for example in the context of Asynchronous Transfer Mode (ATM), the techniques disclosed are more broadly applicable. For example, statistics counters, Transmission Control Protocol (TCP) check-sum calculations or other similar calculations may make good use of the techniques herein disclosed to provide for increased overlap of access latencies and useful computations. The specification and drawings are, accordingly, to be regarded in an illustrative rather than restrictive sense and the invention measured only in terms of the claims and their equivalents.

Figure 1:
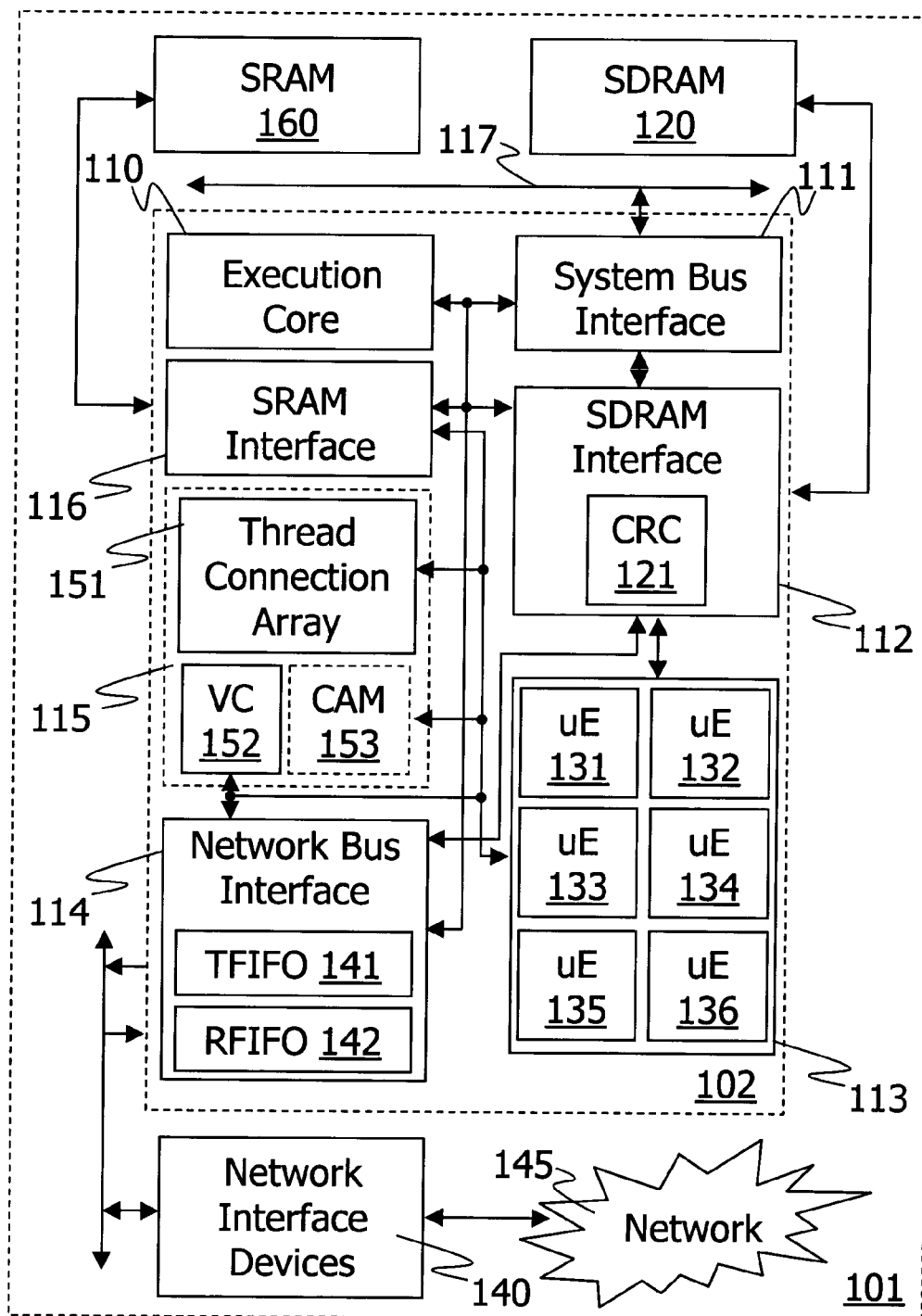
FIG. 1 illustrates one embodiment of a system for performing cyclic redundancy checks (CRC).

FIG. 1 illustrates one embodiment of a system 101 for performing cyclic redundancy checks (CRCs). System 101 comprises one or more network interface devices 140 for transmitting and/or receiving data on a network 145, a serial dynamic random access memory (SDRAM) 120 to store the data and a network processor 102 to process the data, including performing CRC calculations.

Network processor 102 comprises an execution core 110, a system bus interface 111, a network bus interface 114 including a receive first-in-first-out (FIFO) buffer 142 and a transmit FIFO buffer 141 to buffer data received by or to be transmitted by the one or more network interface devices 140, and an SDRAM interface 112 to access data in receive FIFO buffer 142, transmit FIFO buffer 141 and/or SDRAM 120. A CRC circuit 121 is coupled with the SDRAM interface 112 to perform CRC calculations on data accessed in receive FIFO buffer 142, transmit FIFO buffer 141 and/or SDRAM 120 and to produce CRC residues.

A static random access memory (SRAM) 160, accessible via SRAM interface 116, stores instructions of threads of execution to be executed by micro-engine execution circuits 131–136 to process data associated with virtual connections. Micro-engine execution circuits 131–136 execute these threads of execution, which may request CRC circuit 121 to perform CRC calculations on data in receive FIFO buffer 142, transmit FIFO buffer 141 and/or SDRAM 120 to produce CRC residues. One embodiment of network processor 102 optionally comprises an internal storage that stores data structures 115 accessed by micro-engine execution circuits 131–136 and/or by CRC circuit 121. Data structures 115 may include a virtual connection table 152 to hold, for example, VPI/VCI values, outgoing ports, CRC residues, etc.; and a thread connection array 151 to hold connection indices assigned to threads of execution; or optionally including a content addressable memory (CAM) 153 to hold CRC residues associated with particular connection indices. For alternative embodiments of network processor 102, all or some of data structures 115 may be stored in SRAM 160, or in SDRAM 120. For example, in one alternative embodiment of network processor 102, thread connection array 151 or CAM 153 may be stored internally while virtual connection table 152 may be stored in SRAM 160.

Figure 2:
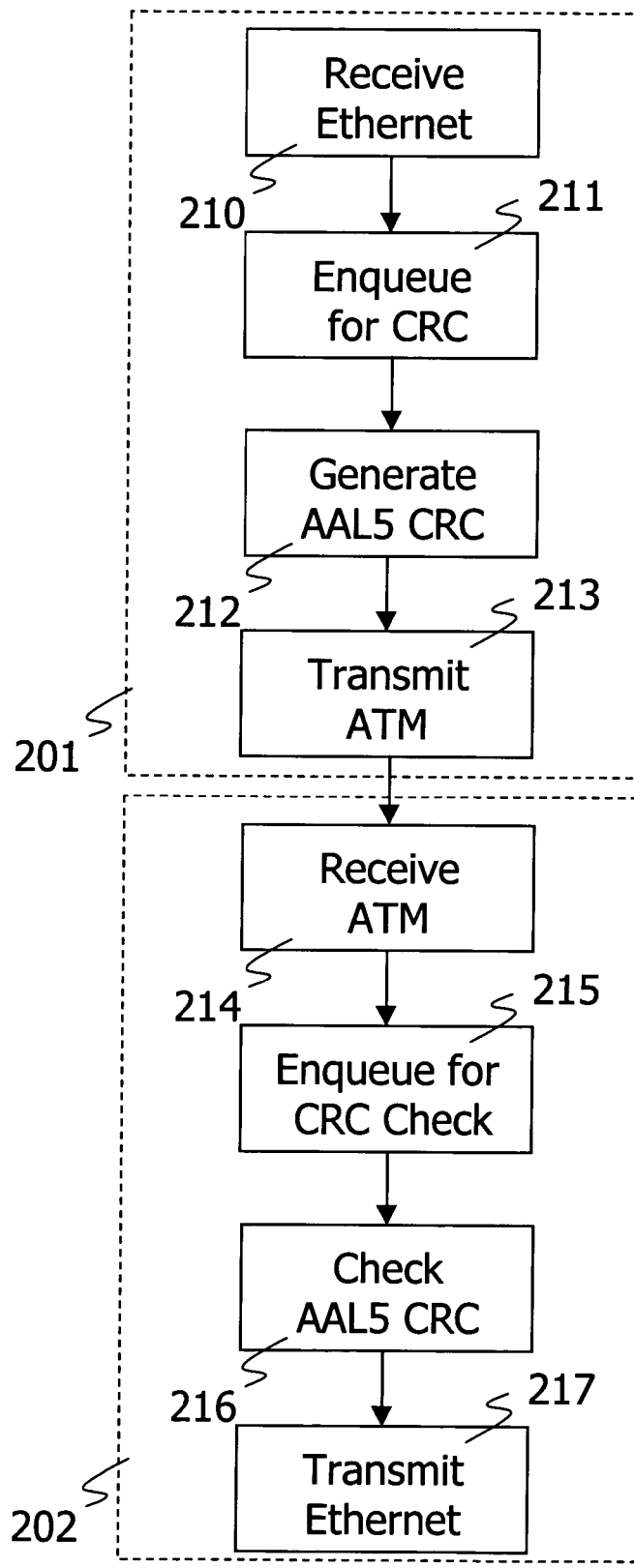
FIG. 2 illustrates a flow diagram for an exemplary process to transmit and receive data using Asynchronous Transfer Mode (ATM).

FIG. 2 illustrates a flow diagram for exemplary process 201 to transmit and exemplary process 202 to receive encapsulated Ethernet data using Asynchronous Transfer Mode (ATM). Process 201, process 202 and other processes herein disclosed are performed by processing blocks that may comprise dedicated hardware or software or firmware operation codes executable by general purpose machines or by special purpose machines or by a combination of both. It will be appreciated that while process 201, process 202 and other processes herein disclosed are illustrated, for the purpose of clarity, as processing blocks with a particular sequence, some operations of these processing blocks may also be conveniently performed in parallel or their sequence may be conveniently permuted so that the some operations are performed in different orders, or some operations may be conveniently performed out of order.

In processing block 210, data is received from an Ethernet transmission. The data is enqueued for CRC calculations in processing block 211. Payload data for each cell may be buffered in SDRAM 120, for example. Processing then proceeds in processing block 212 where the AAL5 CRC residues are generated. It will be appreciated that it is not necessary that data from all of the cells is enqueued before processing of AAL5 CRC residues may proceed in processing block 212, CRC residues being carried forward to each successive cell. As cells are processed they are assembled into the packet for transmission and the AAL5 CRC residue of the last cell of the packet is affixed to the packet. Then, in processing block 213, data packets and CRC residues for a particular connection are transmitted using ATM.

In processing block 214, packets and CRC residues for a particular connection are received from ATM transmission. The data cells are enqueued for CRC checks in processing block 215. Processing then proceeds in processing block 216 where the AAL5 CRC residues are used to check the data transmission, beginning with the residue that was affixed to the packet and with residues again being carried forward to each successive cell. The AAL5 CRC residue of the last cell of the packet should result in zeroes if there are no errors. Then, in processing block 217, the data that has been reassembled is ready for Ethernet transmission.

Figure 3:
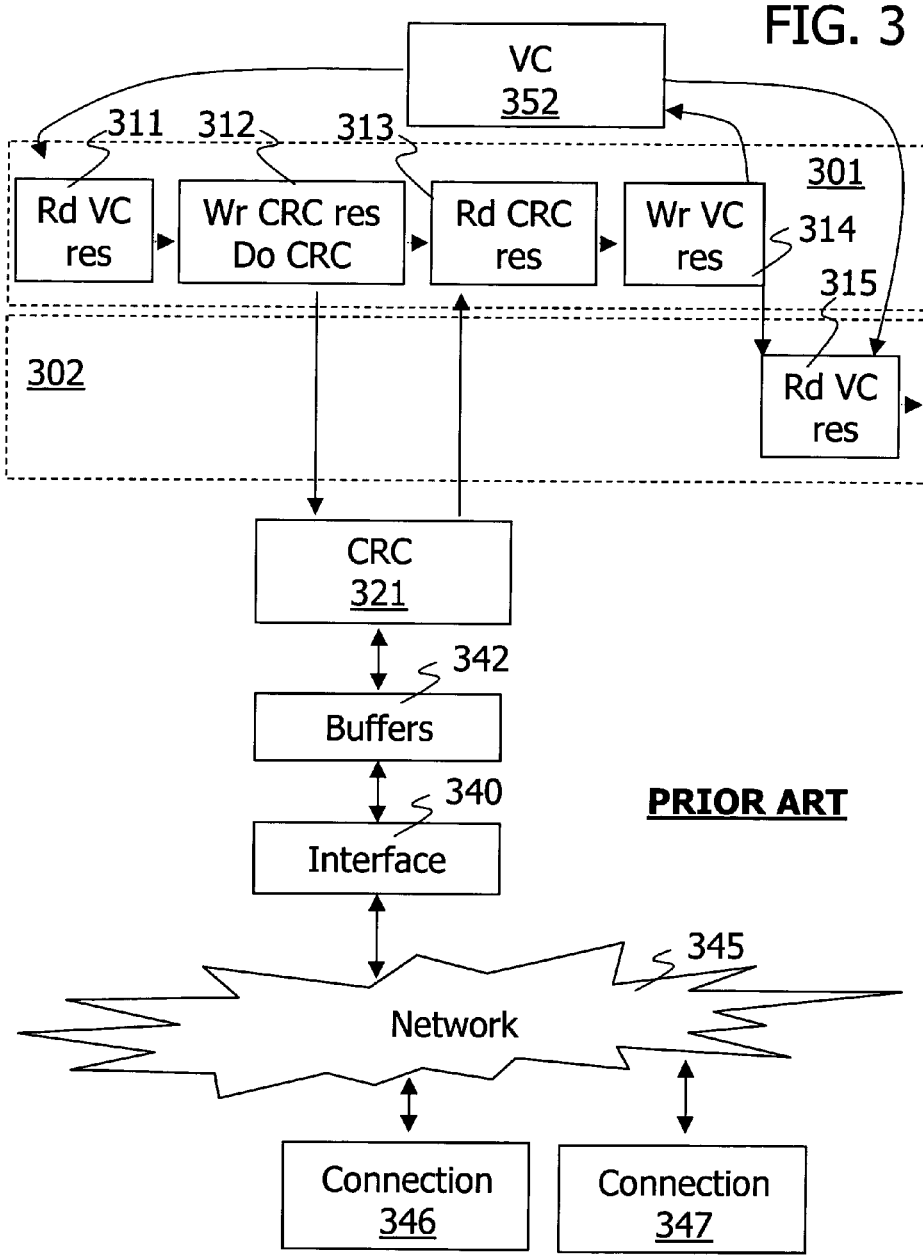
FIG. 3 illustrates a flow diagram for a prior art process for performing sequential CRCs with multiple threads.

FIG. 3 illustrates a flow diagram for a prior art process for performing sequential CRCs with multiple threads. Data packets and CRC residues are received and transmitted for connection 346 and connection 347 over the network 345 by network interface 340. Cells from the packets are buffered by buffers 342.

One or more execution circuits may execute thread 301 and thread 302, which may request CRC circuit 321 to perform CRC calculations on the data cells in buffers 342 to produce CRC residues. A virtual connection (VC) table 352 holds CRC residues for each of connection 346 and connection 347. In the example illustrated, thread 301 and thread 302 are executed adjacently and thread 301 and thread 302 process sequential cells of the same connection. Therefore, as will be further described, an access 315 to retrieve a CRC residue from VC table 352 must be performed sequentially with respect to the access 314 that updates the CRC residue in VC table 352.

Responsive to the execution of thread 301, processing block 311 reads a residue for a particular connection from VC table 352. Horizontal dotted arrows illustrated between processing blocks represent some nonspecific time before the beginning of a subsequent processing block, which is usually associated with the latencies of accessing VC table 352 or CRC circuit 321. In processing block 312, the residue retrieved from VC table 352 is written to CRC circuit 321 and a CRC calculation is initiated and subsequently performed by CRC circuit on a cell from buffers 342 of the connection associated with thread 301. Processing block 313 reads the CRC residue produced by CRC circuit 321 in response to the CRC calculation initiated in processing block 312. In processing block 314, the CRC residue that was read in processing block 313 is written to VC table 352 to update the CRC residue for the connection associated with thread 301. A signal may also be generated to indicate that CRC processing of the next sequential cell of the connection may begin.

Since thread 301 and thread 302 process sequential cells of the same connection, execution of thread 302 may now read the updated CRC residue. Responsive to the execution of thread 302, processing block 315 reads the updated residue for the connection from VC table 352 and subsequently goes on to perform a CRC calculation substantially similar to that of thread 301. In such cases as described with respect to FIG. 3, potential throughput of a network processor may be limited whenever a read access to retrieve a CRC residue from VC table 352 must be performed sequentially with respect to the write access that updates the CRC residue in VC table 352.

Figure 4:
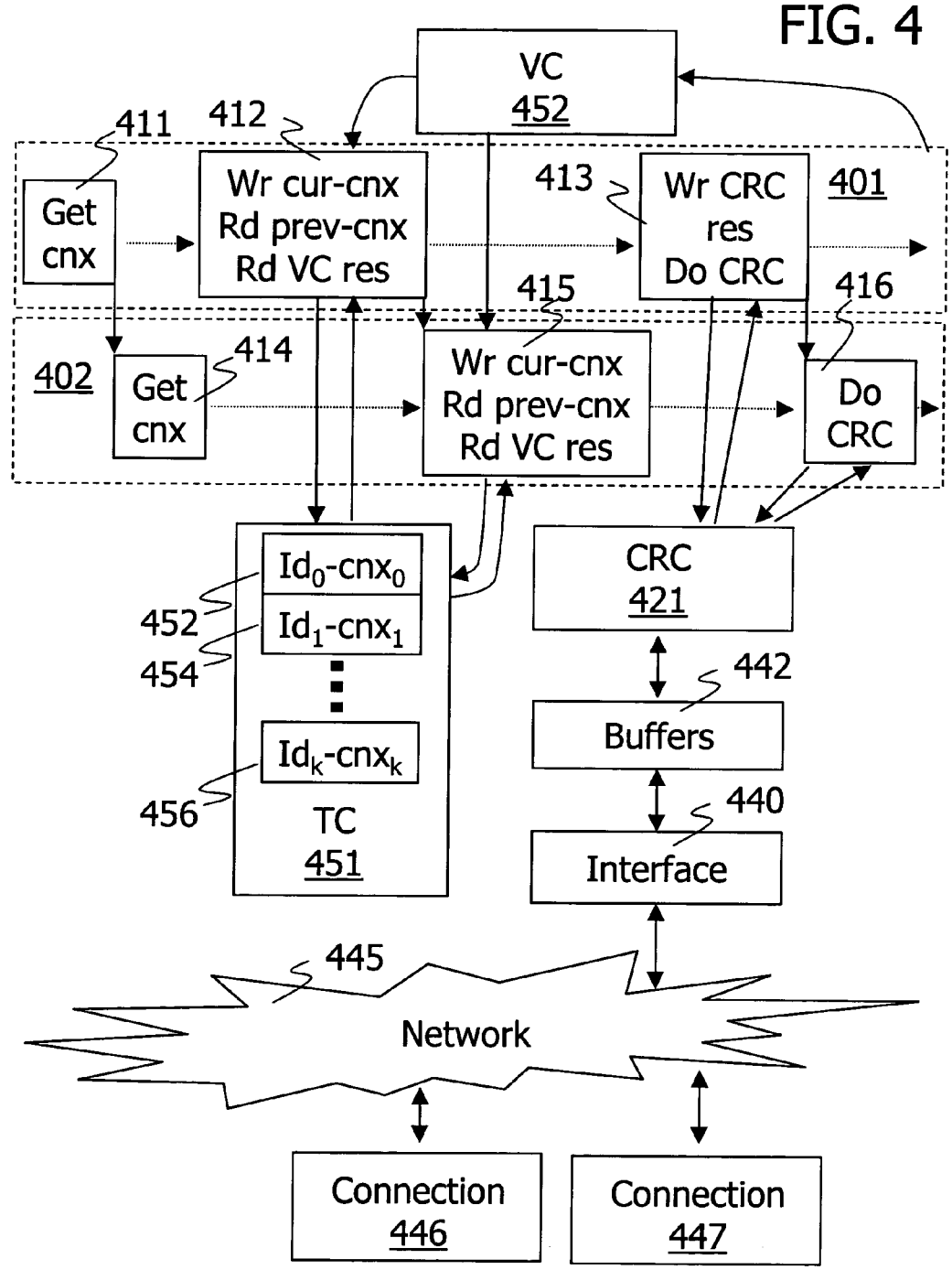
FIG. 4 illustrates one embodiment of a process and apparatus using thread connection indices to perform CRCs.

FIG. 4 illustrates one embodiment of a process and apparatus using thread connection indices to perform CRC calculations, which may provide for improved throughput of a network processor for processing sequential cells of the same connection. Data packets and CRC residues are received and transmitted for connection 446 and connection 447 over the network 445 by network interface 440. Cells from the packets are buffered by buffers 442. For one embodiment of network processor 102, buffers 442 may reside in network bus interface 114. For an alternative embodiment of network processor 102, buffers 442 may reside in SDRAM 120 or in SDRAM interface 112.

VC table 452 holds CRC residues for all connections including connection 446 and connection 447. Thread connection array 451 stores entries 452–456 for all threads, Each of entries 452–456 associates a thread's Id (or number) with a connection index for performing CRC calculations, for example, using the CRC residue produced for previous thread 401 when thread 402 and previous thread 401 share the same connection index.

In the example illustrated, thread 401 and thread 402 are executed adjacently and thread 401 and thread 402 process sequential cells of the same connection. One or more execution circuits may execute thread 401 and thread 402, which may request CRC circuit 421 to perform CRC calculations on data cells in buffers 442 to produce CRC residues.

Responsive to the execution of thread 401, processing block 411 gets its connection index. One embodiment of a connection index may be assigned to a thread by a hash lookup using the VCI/VPI value of the connection. One embodiment might assign to a thread the VC table 452 entry of the connection as a connection index. An alternative embodiment might assign to a thread a pointer to the entry in the VC table 452. A signal may also be generated to indicate that CRC processing of the next sequential cell of the connection or of the next thread may begin. For one embodiment of network processor 102, threads may be scheduled in round-robin order. For alternative embodiments, some other order for scheduling may be conveniently chosen. Since thread 401 and thread 402 are adjacent threads and also process sequential cells of the same connection, execution of thread 402 may now begin with processing block 414 which gets its connection index.

Processing block 412 writes its connection index to TC array 451, reads the connection index of the previous thread from TC array 451, and reads a residue for its connection from VC table 452, some or all of these accesses which may be performed concurrently or in parallel. A signal may also be generated to indicate that CRC processing of the next thread may continue. Subsequently, processing block 415 writes its connection index to TC array 451, reads the connection index of previous thread 401 from TC array 451, and reads a residue for its connection from VC table 452.

In processing block 413 of thread 401, the residue retrieved from VC table 452 is written to CRC circuit 421 (if the connection index of the thread previous to thread 401 was different than the connection index of thread 401) and a CRC calculation is initiated and subsequently performed by CRC circuit on a cell from buffers 442 of the connection associated with thread 401. Again a signal may also be generated to indicate that CRC processing of the next thread may continue. In processing block 416 of thread 402, the residue retrieved from VC table 452 is not written to CRC circuit 421 because the connection index of thread 401, which is previous to thread 402 is the same connection index of thread 402. Therefore the CRC residue retrieved from VC table 452 is stale and the residue most recently produced by CRC circuit 421 for thread 401 and already stored in CRC circuit 421 is the correct residue, so a CRC calculation is initiated in processing block 416 and subsequently performed by CRC circuit 421 on a cell from buffers 442 of the same connection associated with thread 401 and thread 402. Thus use of thread connection indices in TC array 451 may provide for an increased overlap of thread 401 and thread 402 execution, reduced sequential latencies, and improved throughput of a network processor for processing sequential cells of the same connection.

Further processing (not shown) in thread 401 and thread 402 continues to read their respective CRC residues produced by CRC circuit 421 and to write their respective CRC residues to VC table 352 to update the CRC residue for the connection associated with thread 401 and thread 402. It will be appreciated that the above example may be extended for alternative embodiments including multiple CRC circuits and further including comparison of connection indices for other threads in addition to the most previous thread.

Figure 5A:
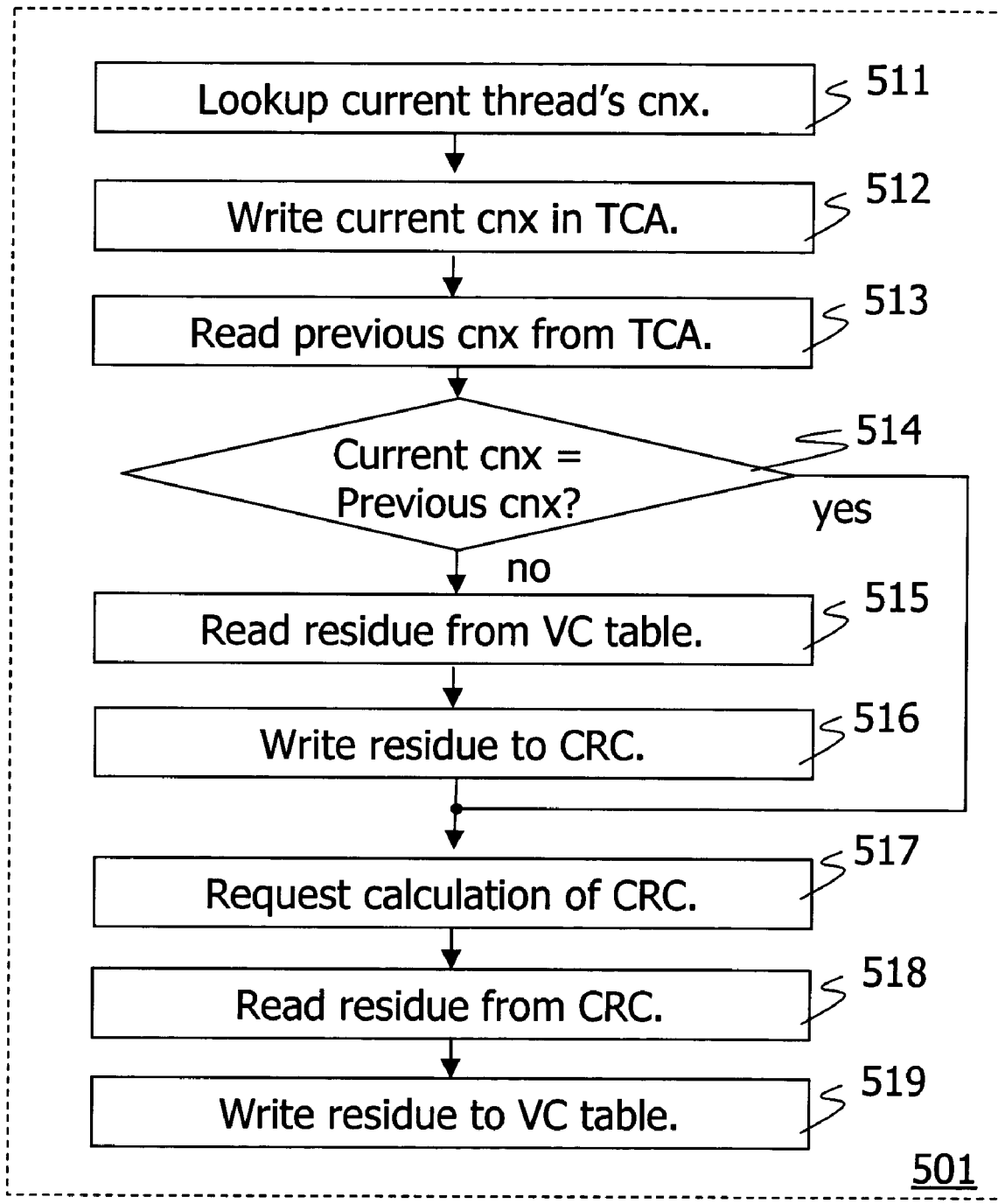
FIG. 5*a* illustrates a flow diagram for one embodiment of a process for performing CRCs using thread connection indices.

FIG. 5a illustrates a flow diagram for one embodiment of a process 501 for performing CRCs using thread connection indices. In processing block 511, a lookup of the current thread's connection index is performed. In processing block 512, the current thread writes its connection index to thread connection array (TCA) 151. In processing block 513, the current thread reads the connection index of the previous thread from TCA 151. In processing block 514, the connection index of the current thread is compared to connection index of the previous thread. If they are different, processing continues in processing block 515 where the current thread reads a residue for its connection from VC table 152, and in processing block 516 where the current thread writes the residue to CRC circuit 121.

Otherwise, if the connection index of the current thread is equal to the connection index of the previous thread in processing block 514, processing proceeds directly to processing block 517 where a CRC calculation is requested from CRC circuit 121. Processing then continues in processing block 518, where the current thread reads the CRC residue from CRC circuit 121, and in processing block 519, where the current thread writes the CRC residue to VC table 152.

As previously suggested, one or more operations of the processing blocks 511-519 may be conveniently performed concurrently or in parallel or in different orders (for example, processing blocks 512–513).

Figure 5B:
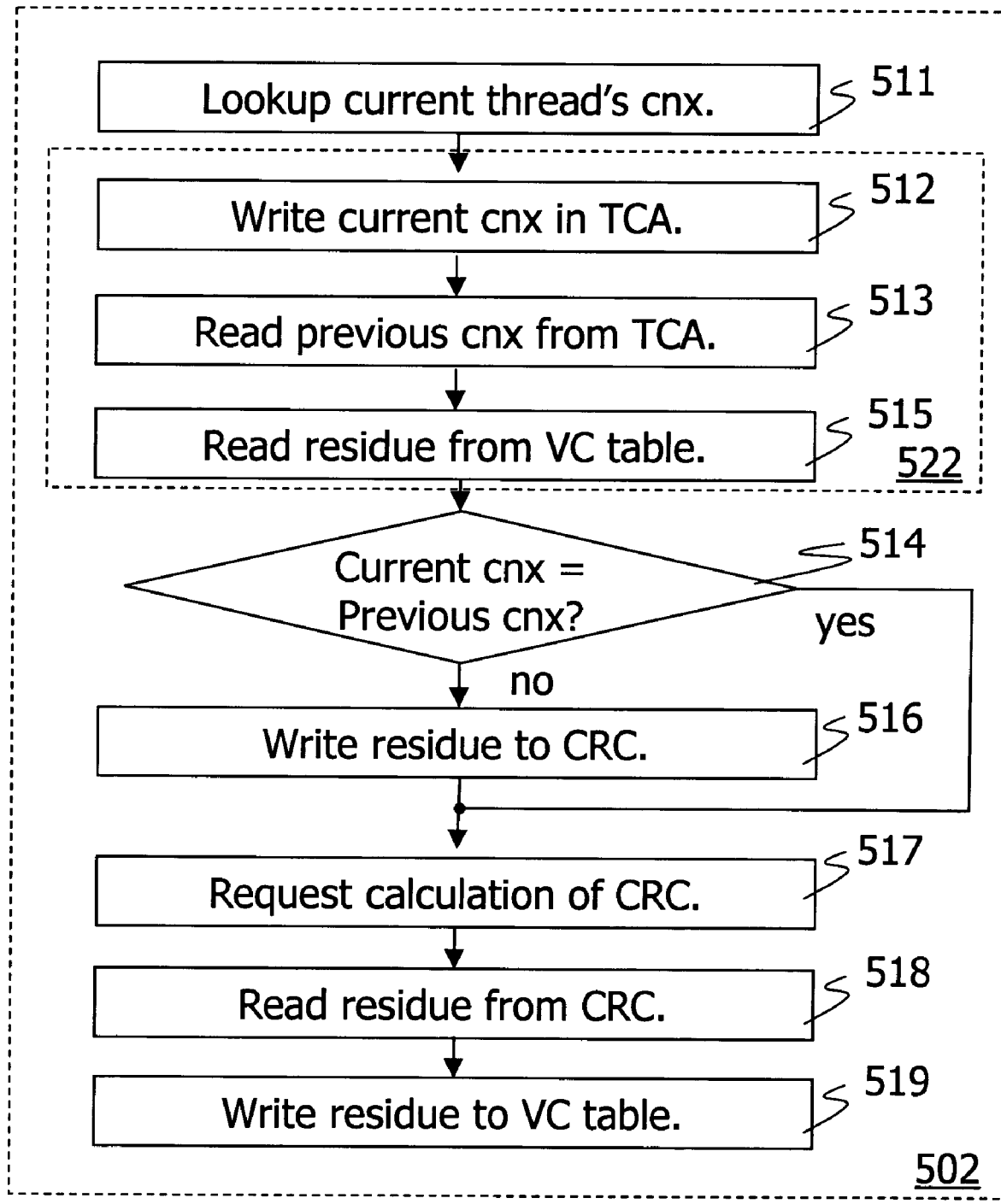
FIG. 5*b* illustrates a flow diagram for an alternative embodiment of a process for performing CRCs using thread connection indices.

FIG. 5b illustrates a flow diagram for an alternative embodiment of a process for performing CRCs using thread connection indices. In processing block 511, a lookup of the current thread's connection index is performed.

In processing block 512, the current thread writes its connection index to TCA 151. In processing block 513, the current thread reads the connection index of the previous thread from TCA 151. In processing block 515, the current thread reads a residue for its connection from VC table 152. As previously suggested, some or all of the accesses of processing block 522 may be performed concurrently of in parallel, thereby overlapping the associated latencies.

In processing block 514, the connection index of the current thread is compared to connection index of the previous thread. If they are different, processing continues in processing block 516 where the current thread writes the residue to CRC circuit 121.

Otherwise, if the connection index of the current thread is equal to the connection index of the previous thread in processing block 514, processing proceeds directly to processing block 517 where a CRC calculation is requested from CRC circuit 121. Processing then continues in processing block 518, where the current thread reads the CRC residue from CRC circuit 121, and in processing block 519, where the current thread writes the CRC residue to VC table 152.

Figure 6:
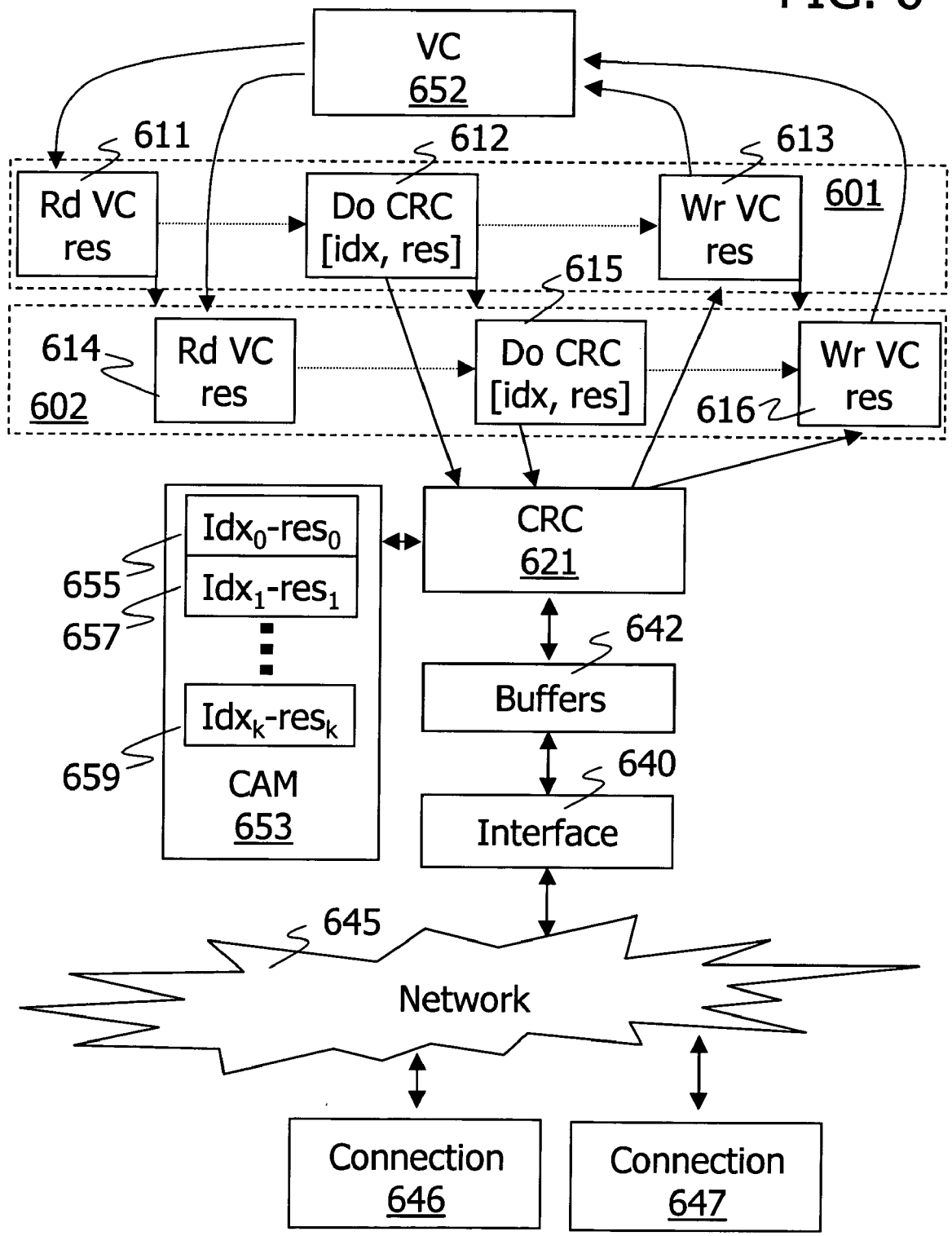
FIG. 6 illustrates an alternative embodiment of a process and apparatus using a content addressable memory to perform CRCs.

FIG. 6 illustrates an alternative embodiment of a process and apparatus using a content addressable memory to perform CRCs, which may provide for improved throughput of a network processor for processing cells of the same connection. Data packets and CRC residues are received and transmitted for connection 646 and connection 647 over the network 645 by network interface 640. Cells from the packets are buffered by buffers 642.

VC table 652 holds CRC residues for all connections including connection 646 and connection 647. Content addressable memory (CAM) 653 stores entries 655, 657 . . . 659 for active connections having associated threads that have provided connection indices when requesting CRC calculations. These connection indices are associated with the last CRC residue produced for a thread of the same connection index.

One or more execution circuits may execute thread 601 and thread 602, which may request CRC circuit 621 to perform CRC calculations on data cells in buffers 642 to produce CRC residues.

Processing (not shown) in thread 601 and thread 602 begin with getting their threads' respective connection indices substantially similar to the processes described above. Further responsive to the execution of thread 601, processing block 611 reads a residue for its connection from VC table 652. A signal may also be generated to indicate that CRC processing of the next thread may continue. Subsequently, processing block 614 reads a residue for its connection from VC table 652.

In processing block 612 of thread 601, the thread's connection index and the residue retrieved from VC table 652 is supplied to CRC circuit 621 and a CRC calculation is initiated. CRC circuit 621 accesses CAM 653 using the thread's connection index. A CRC calculation using the residue retrieved from VC table 652 in case of a miss in CAM 653 and using the CRC residue associated with the thread's connection index in case of a hit in CAM 653 is subsequently performed by CRC circuit 621 on a cell from buffers 642 of the connection associated with thread 601. Again a signal may also be generated to indicate that CRC processing of the next thread may continue.

In processing block 615 of thread 602, the thread's connection index and the residue retrieved from VC table 652 is supplied to CRC circuit 621 and another CRC calculation is initiated. CRC circuit 621 again accesses CAM 653 using the connection index of thread 602. A CRC calculation, using the residue retrieved from VC table 652 in case of a miss in CAM 653 and using the CRC residue associated with the thread's connection index in case of a hit in CAM 653, is subsequently performed by CRC circuit 621 on a cell from buffers 642 of the connection associated with thread 601. Thus use of thread connection indices in CAM 653 may provide for an increased overlap of thread 601 and thread 602 execution, reduced sequential latencies, and improved throughput of a network processor for processing cells of the same connection.

Processing block 613 in thread 601, and processing block 616 in thread 602 continue to get the respective CRC residues produced by CRC circuit 621 and to write their respective CRC residues to VC table 652.

Figure 7:
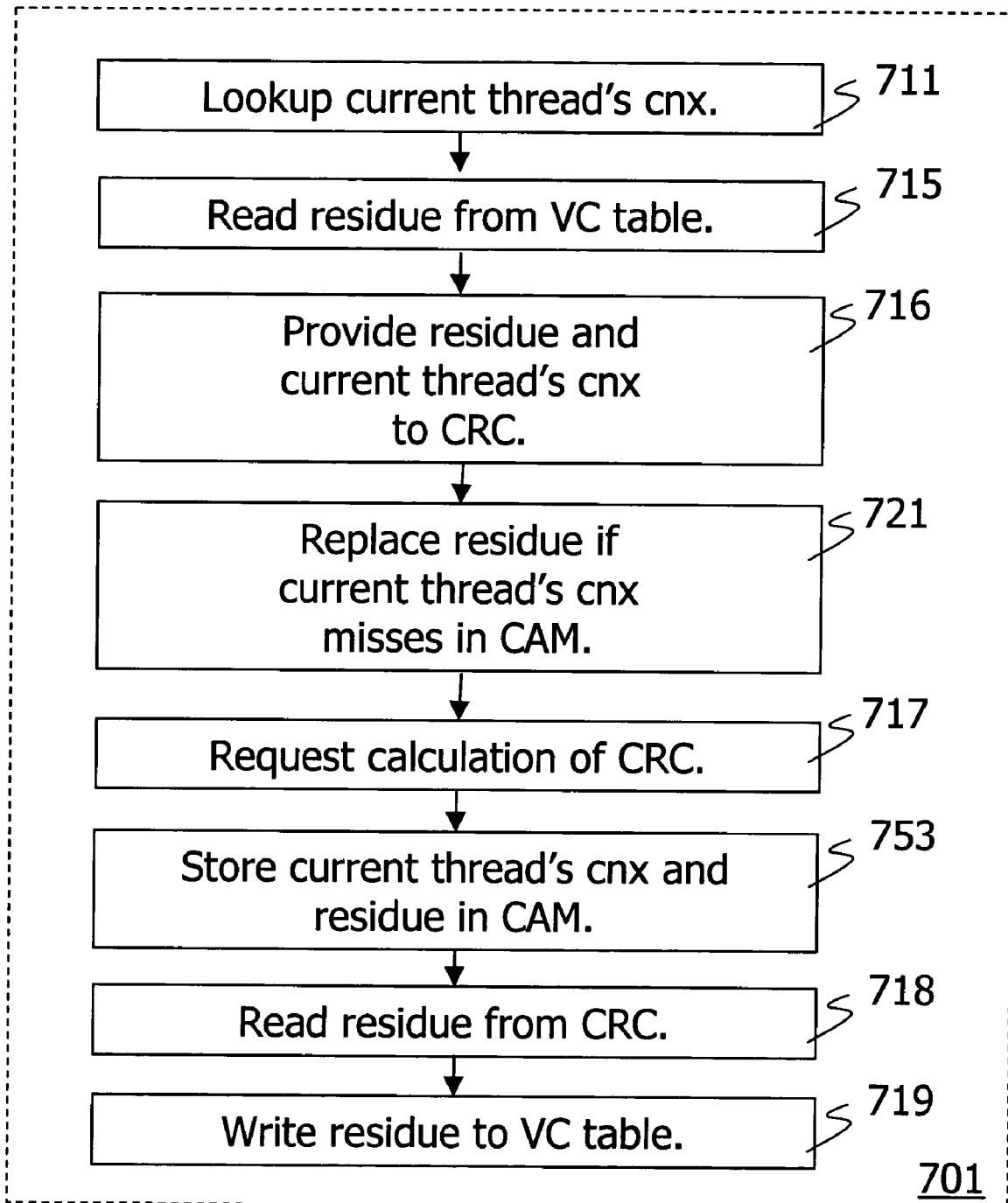
FIG. 7 illustrates a flow diagram for one embodiment of a process for performing CRCs using a content addressable memory.

FIG. 7 illustrates a flow diagram for one embodiment of a process for performing CRCs using a content addressable memory. In processing block 711, a lookup of the current thread's connection index is performed. In processing block 715, the current thread reads a residue for its connection from VC table 652. Processing continues in processing block 716 where the current thread provides the residue and the current thread's connection index to CRC circuit 621. CRC circuit 621 accesses CAM 653 using the current thread's connection index and replaces the residue with the residue retrieved from VC table 652 in case of a miss in CAM 653. Otherwise, in case of a hit in CAM 653, CRC circuit 621 replaces the residue with the CRC residue in CAM 653 associated with the current thread's connection index. Therefore the CRC residue retrieved from VC table 652 is stale and the residue most recently produced by CRC circuit 621 for the current connection index and already stored in CAM 653 is the correct residue.

Processing proceeds to processing block 717 where a CRC calculation is requested from CRC circuit 621. Subsequently a CRC calculation is performed by CRC circuit 621 on a cell of the connection associated with the current thread and in processing block 753, the resulting CRC residue is stored in CAM 653. Processing then continues in processing block 718, where the current thread reads the CRC residue from CRC circuit 621, and in processing block 719, where the current thread writes the CRC residue to VC table 652.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A method comprising:
    comparing a first connection index of a current thread of execution with a second connection index of a previous thread of execution; and
    performing a CRC calculation using a CRC residue produced for the previous thread if the current thread of execution and the previous thread of execution share the same connection index.

2. The method of claim 1 wherein the CRC residue produced for the previous thread is the most recently produced CRC residue.

3. The method of claim 2 wherein the CRC calculation is performed without the current thread of execution providing any CRC residue to a centralized CRC unit.

4. An article of manufacture comprising
a machine-accessible medium including data that, when accessed by a machine, cause the machine to perform the method of claim 2.

5. The method of claim 1 wherein the CRC residue produced for the previous thread is associated with a preceding sequential cell of the same packet as the current thread.

6. The method of claim 5 wherein the current thread of execution provides the first connection index to access the content addressable memory.

7. The method of claim 5 wherein a hit in the content addressable memory indicates that a corresponding CRC residue associated with the first connection index resulted from a preceding sequential cell of the same packet as the current thread.

8. An article of manufacture comprising
a machine-accessible medium including data that, when accessed by a machine, cause the machine to perform the method of claim 7.

9. The method of claim 1 wherein the CRC residue produced for the previous thread is stored in a content addressable memory.

10. An article of manufacture comprising a machine-accessible medium including data that, when accessed by a machine, cause the machine to:
associate a current thread of execution with a first connection index for a first connection;
identify a first CRC residue stored for the first connection; and
initiate a CRC calculation for the first connection using, instead of the first CRC residue, a second CRC residue produced for a previous thread if the previous thread of execution is also associated with the first connection index.

11. The article of manufacture of claim 10 further including data that, when accessed by the machine, cause the machine to:
initiate the CRC calculation for the first connection using the first CRC residue if the previous thread of execution is not associated with the first connection index.

12. The article of manufacture of claim 11 further including data that, when accessed by the machine, cause the machine to:
provide the first CRC residue to a centralized CRC circuit.

13. The article of manufacture of claim 10 wherein the CRC calculation is initiated without the current thread of execution providing the first or second CRC residues to a centralized CRC circuit.

14. The article of manufacture of claim 10 further including data that, when accessed by the machine, cause the machine to:
store the first connection index in a thread connection array.

15. An article of manufacture comprising a machine-accessible medium including data that, when accessed by a machine, cause the machine to:
associate a current thread of execution with a first connection index for a first connection;
provide the first connection index to a centralized CRC circuit to identify a CRC residue stored for a previous thread of execution; and
initiate a CRC calculation for the first connection using the CRC residue stored for the previous thread of execution if the previous thread of execution is also associated with the first connection index.

16. The article of manufacture of claim 15 wherein the CRC residue is stored for the previous thread of execution in a content addressable memory and is accessible by the centralized CRC circuit using the first connection index.

17. An apparatus comprising:
a memory interface to access a first data and a second data from a memory;
a CRC circuit coupled with the memory interface to perform CRC calculations on data from the memory and to produce CRC residues;
an instruction storage to store instructions of a first thread of execution associated with a first connection index and a second thread of execution associated with a second connection index; and
an execution circuit coupled with the CRC circuit to execute the first thread of execution and the second thread of execution, said execution circuit to request the CRC circuit to perform a first CRC calculation on the first data and to produce a first CRC residue responsive to executing the first thread of execution, and said execution circuit, responsive to executing the second thread of execution, to compare the first connection index with the second connection index and to request the CRC circuit to perform a second CRC calculation on the second data using the first CRC residue when the first connection index is equal to the second connection index.

18. The apparatus of claim 17 wherein said memory is a FIFO buffer.

19. The apparatus of claim 17 wherein said memory is SDRAM.

20. The apparatus of claim 17 wherein said execution circuit, responsive to executing the second thread of execution, is further to retrieve a second CRC residue from a connection table and to request the CRC circuit to perform the second CRC calculation on the second data using the second CRC residue when the first connection index is not equal to the second connection index.

21. The apparatus of claim 17 wherein said execution circuit, responsive to executing the second thread of execution, is further to store the second connection index in a thread connection array and retrieve the first connection index from the thread connection array.

22. An apparatus comprising:
a memory interface to access a first data and a second data from a memory;
a CRC circuit coupled with the memory interface to perform CRC calculations on data from the memory and to produce CRC residues;
an instruction storage to store instructions of a first thread of execution associated with a first connection index and a second thread of execution associated with a second connection index;
a content addressable memory coupled with the CRC circuit to store CRC residues addressable by the first connection index and the second connection index; and
an execution circuit coupled with the CRC circuit to execute the first thread of execution and the second thread of execution, said execution circuit to request the CRC circuit to perform a first CRC calculation on the first data and to produce a first CRC residue responsive to executing the first thread of execution, and said execution circuit, responsive to executing the second thread of execution, to provide the second connection index to the CRC circuit and to request the CRC circuit to perform a second CRC calculation on the second data using the first CRC residue when the second connection index addresses the first CRC residue in the content addressable memory.

23. The apparatus of claim 22 wherein said execution circuit, responsive to executing the second thread of execution, is further to retrieve a second CRC residue from a connection table and to request the CRC circuit to perform the second CRC calculation on the second data using the second CRC residue when the second connection index does not address the first CRC residue in the content addressable memory.

24. A system comprising:
one or more network interface devices;
a network bus interface to buffer data received by or to be transmitted by said one or more network interface devices;
a memory to store the data;
a memory interface to access a first data and a second data from the memory;
a CRC circuit coupled with the memory interface to perform CRC calculations on data accessed from the memory and to produce CRC residues;
an instruction storage to store instructions of a first thread of execution associated with a first connection index and a second thread of execution associated with a second connection index; and
an execution circuit coupled with the CRC circuit to execute the first thread of execution and the second thread of execution, said execution circuit to request the CRC circuit to perform a first CRC calculation on the first data, storing in the CRC circuit a first CRC residue responsive to executing the first thread of execution, and said execution circuit to request the CRC circuit to perform a second CRC calculation on the second data using the stored CRC residue, responsive to executing the second thread of execution, when the first connection index is equal to the second connection index.

25. The system of claim 24 wherein said execution circuit, responsive to executing the second thread of execution, is further to compare the first connection index with the second connection index and to retrieve a second CRC residue from a connection table and to request the CRC circuit to perform the second CRC calculation on the second data using the second CRC residue when the first connection index is not equal to the second connection index.

26. The system of claim 24 wherein said CRC circuit includes a residue storage addressable by connection indices to store CRC residues.

27. The system of claim 26 wherein said execution circuit, responsive to executing the second thread of execution, is further to retrieve a second CRC residue from a connection table and to request the CRC circuit to perform the second CRC calculation on the second data using the second CRC residue when the second connection index does not address the first CRC residue in the residue storage.

* * * * *